D. J. Wilcoxson,
Steering.
N° 23,534.    Patented Apl. 5, 1859.

UNITED STATES PATENT OFFICE.

D. J. WILCOXSON, OF MILAN, OHIO, ASSIGNOR TO HIMSELF, AND ISAAC COLLINS, OF HURON, OHIO.

SHIP'S STEERING APPARATUS.

Specification of Letters Patent No. 23,534, dated April 5, 1859.

*To all whom it may concern:*

Be it known that I, D. J. WILCOXSON, of Milan, Erie county, State of Ohio, have invented certain new and useful Improvements in Steering Apparatus for Vessels, of which the following is a full, clear, and exact description, reference being had to the accompanying drawings, forming part of this specification, in which—

Figure 1:
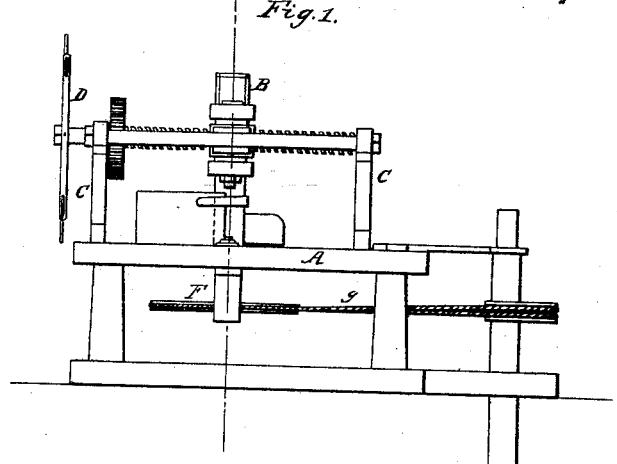
Figure 2:
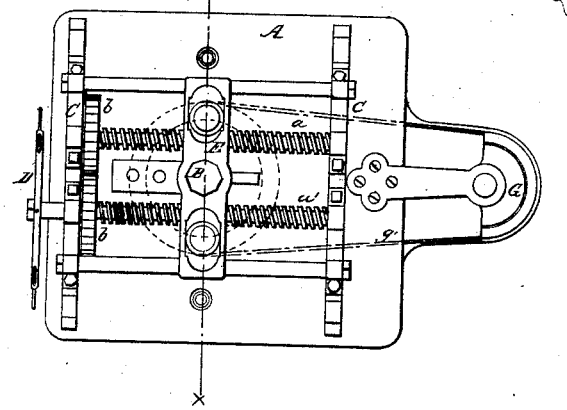
Figure 3:
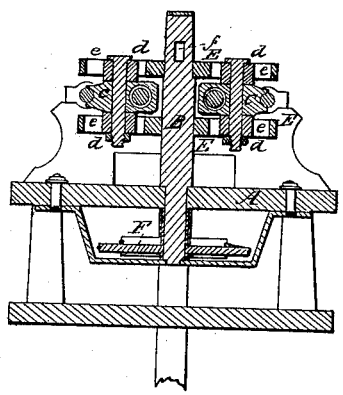

Figure 1 represents a plan of a steering apparatus embracing my improvements. Fig. 2 represents a side elevation of the same, and Fig. 3 represents a vertical section on the line $x\ x$ of Fig. 1.

My improvements in steering apparatus for vessels relate to that class in which two parallel screws are used to control and give motion to the rudder, the nuts of which act on the yoke of the rudder posts.

Right and left screws are generally used in connection operated by the wheel shaft which is parallel to and midway between both screws, and directly over the center of the rudder posts, and a toothed wheel on the shaft gears into a toothed pinion attached to each screw turning them in opposite directions. Both screws the threads running in the same direction have been used, and the wheel attached to one, which by toothed pinions give motion to the other. With this arrangement the screws are directly over each other and over the center of the rudder posts.

In all the arrangements in which either the single or double screw is used to turn the rudder, the top of the rudder posts and the yoke is below the level of the screws, and connection is made between the movable nut of the screws and the yoke by a stud extending downward from the side of the nut and entering a slot in the yoke—hence the strain on the nut is not in line with the axis of the screw but on one side or the other, depending upon the direction in which it is traversing, which causes the nut to wear unequally, increases the friction of the screws, and consequently the power required to turn the rudder.

To overcome this defect in the arrangement of the yoke is the principal object of my improvements, and my invention for effecting this object consists, first, in forming the connection between the nuts which traverse the screws and the rudder post, by means of two yokes, one of which is arranged above and the other below the screw, so that the strain upon the nuts will be on either side parallel to the axis of the screw. Second, in arranging the screws on either side and below the top of the rudder post, so that in case of accident to the steering apparatus it may be disconnected from the rudder post and the tiller used to steer the vessel.

By reference to the accompanying drawings my improvements in steering apparatus will be more readily understood.

(A) represents the deck of a vessel with the rudder post (B) extending up through the deck, and directly over the rudder post and firmly bolted to the deck is a strong frame (C) which contains the steering apparatus. This apparatus consists of two screws ($a\ a'$) (the threads of both running in the same direction) arranged on either side of the rudder post parallel to each other, and having their bearings in the ends of the frame. The shank of the screw ($a'$) extends beyond the face of the frame and has attached to its end a wheel (D) with projecting spokes by which it is turned and communicates its motion to the other screw ($a$) in the opposite direction by means of toothed pinions ($b$) attached to the screws and gearing into each other. Each screw carries a nut ($c$) with an elongated shank projecting both above and below the screws, and on either shank of each nut is a friction roller ($d$). To the rudder post (B) which extends above the screws is attached two yokes (E, E') one of which is above and the other below the screws, and in the ends of the yokes are vertical slots ($e$) to receive the shanks of the nuts with the friction rollers. The slots are of sufficient length to admit of the rollers traversing in them as the yokes are turned. The turning of the wheel causes these nuts to traverse back and forward on the screws in opposite directions, and while one nut is drawing one end of the yokes in one direction the other nut is pushing the opposite end of the yokes in a contrary direction, thus they mutually assist each other in turning the rudder.

It will be seen from the arrangement of the yokes, one being above and the other below the screws, that the strain on the nuts is parallel to the axis of the screw and no lateral strain is brought on the nut, which would tend to twist it or cause it to bind the screw, and greater strength is given to the connection between the yokes and the rudder post, and their liability to become loose on the rudder post is greatly diminished.

A hole (f) is mortised in the rudder post above the screws to receive a tiller by which the rudder may be operated should any accident happen to the steering apparatus, which in that case would be disconnected from the yokes by removing the nuts from the slots in the yoke.

In using this apparatus for steering steam boats, the steering mechanism instead of being placed over the rudder post is located in the wheel house, and the double yoke is attached to a vertical shaft passing through the upper deck, on the lower end of which is a grooved wheel (F) to which is attached chains (g) that extend straight aft and connected with yoke (G) on the rudder post.

The operation of the steering apparatus is the same as when the mechanism is directly connected with the rudder post, the chains in the latter case transmitting the motion to the yokes in opposite directions.

I do not confine myself to two yokes, one arranged above and the other below the screws, as a single yoke with horizontal and vertical slots in the ends, the horizontal slots to allow the screws to pass through the yoke so that the bearing of the yoke would be on either side of the screws the same as when the double yoke is used; and the vertical slots for the traverse of the nut, might in some cases be substituted with advantage for the two yokes.

Having thus described my improvements in steering apparatus for vessels, what I claim therein as new and desire to secure by Letters Patent is—

1. The combination of the double yoke with the traversing nuts, arranged substantially as described for the purposes set forth.

2. Arranging the screws by which the rudder is turned, on either side and below the top of the rudder post, so that in case of accident the tiller may be used to steer the vessel without its being interfered with by the steering mechanism.

In testimony whereof I have subscribed my name.

D. J. WILCOXSON.

Witnesses:
F. SOUTHGATE SMITH,
ARTHUR W. FLETCHER.